(12) United States Patent
Li

(10) Patent No.: US 9,696,841 B2
(45) Date of Patent: Jul. 4, 2017

(54) METHOD AND APPARATUS FOR CONTROLLING AN ELECTRIC DEVICE

(71) Applicants: Beijing Lenovo Software Ltd., Beijing (CN); Lenovo (Beijing) Limited, Beijing (CN)

(72) Inventor: Xin Li, Beijing (CN)

(73) Assignees: BEIJING LENOVO SOFTWARE LTD., Beijing (CN); LENOVO (BEIJING) LIMITED, Beijing (CN)

(*) Notice: Subject to any disclaimer, the term of this patent is extended or adjusted under 35 U.S.C. 154(b) by 220 days.

(21) Appl. No.: 13/827,168

(22) Filed: Mar. 14, 2013

(65) Prior Publication Data

US 2013/0249834 A1    Sep. 26, 2013

(30) Foreign Application Priority Data

Mar. 26, 2012 (CN) .......................... 2012 1 0082701

(51) Int. Cl.
*G06F 3/041* (2006.01)
*G06F 3/0488* (2013.01)

(52) U.S. Cl.
CPC ........ *G06F 3/0416* (2013.01); *G06F 3/04883* (2013.01)

(58) Field of Classification Search
CPC .... G06F 3/0488; G06F 3/04883; G06F 3/044; G06F 3/04886; G06F 3/045

(Continued)

(56) References Cited

U.S. PATENT DOCUMENTS

2005/0114788 A1* 5/2005 Fabritius ............... G06F 1/1626
                                                           715/767
2010/0095206 A1* 4/2010 Kim ........................... 715/702
(Continued)

FOREIGN PATENT DOCUMENTS

| CN | 101399897 A | 4/2009 |
|----|-------------|--------|
| CN | 201754270 U | 3/2011 |
| CN | 102141882 A | 8/2011 |

OTHER PUBLICATIONS

"Chinese Application No. 201210082701.5, Office Action mailed Jun. 11, 2015", w/ English Translation, (Jun. 11, 2015), 16 pgs.

(Continued)

*Primary Examiner* — Sahlu Okebato
(74) *Attorney, Agent, or Firm* — Schwegman Lundberg & Woessner, P.A.

(57) ABSTRACT

The present invention discloses a method and apparatus for controlling an electric device. The electric device has a touch screen. The method comprises: detecting whether there is an operation input on the touch screen so as to generate a piece of detection information; when the detection information indicates that there is an operation input on the touch screen, forming a sliding track on the touch screen in response to the operation; judging whether the sliding track meets a predetermined condition so as to generate judgment information, wherein the predetermined condition is that the sliding track is a curvilinear track and comprises a first contact point and a second contact point, the first contact point and the second contact point being contact points which coincide or not coincide with each other; determining an independent operation area on the touch screen based on the sliding track, and determining a display orientation of a displayed object within the independent operation area based on the sliding track when the judgment (Continued)

information indicates that the sliding track meets the predetermined condition.

14 Claims, 5 Drawing Sheets

(58) Field of Classification Search
USPC .......................................................... 345/173
See application file for complete search history.

(56) References Cited

U.S. PATENT DOCUMENTS

2010/0287470 A1    11/2010  Homma et al.
2015/0264572 A1*  9/2015  Turgeman ............. H04W 12/06
                                                           455/411

OTHER PUBLICATIONS

"Chinese Application No. 201210082701.5, Office Action mailed Oct. 17, 2014", w/ English Translation, (Oct. 17, 2014), 15 pgs.

* cited by examiner

METHOD AND APPARATUS FOR CONTROLLING AN ELECTRIC DEVICE

CROSS REFERENCE TO RELATED APPLICATIONS

This application claims the benefit and priority of a foreign application filed in China as Application No. 201210082701.5 on Mar. 26, 2012, all of which is incorporated herein by reference.

FIELD OF THE INVENTION

The present invention relates to the field of computer technology, and in particular, to a method and apparatus for controlling an electric device.

BACKGROUND OF THE INVENTION

In prior art, an electric device having a touch screen is increasingly popular due to convenience of touch operations and user-friendly operation modes. Especially for a large-size touch screen, it may be used by a plurality of users simultaneously, where the plurality of users operate on the touch screen by designating their own dedicated control area on the touch screen, respectively.

However, during the implementation of the present invention by the inventor, although a user may designate an area to operate as in prior art, it is difficult for an electric device to determine the specific display orientation. For an example of a touch screen 20 as shown in FIG. 1, a user operates the touch screen 20 on the side of the edge 201. The user designates an area 202 on the touch screen 20. Although the user may operate in the area 202 independently, the touch screen 202 is not aware of the location of the user. Therefore, it is difficult to determine the display orientation of an object displayed in the area 202. Therefore, the object is still displayed in the original display orientation, for example, in the display orientation as indicated by "GRAPHICS" in FIG. 1. The bottom of the "GRAPHICS" is close to the edge 203, and therefore it is very inconvenience for the user on the side of the edge 201.

SUMMARY OF THE INVENTION

The present invention provides a method and apparatus for controlling an electric device so as to solve the problem in prior art that it is difficult to determine a specific display orientation when a dedicated area has been designated on a touch screen.

The present invention provides a method for controlling an electric device. The electric device has a touch screen. The method comprises: detecting whether there is an operation input on the touch screen so as to generate detection information; when the detection information indicates that there is an operation input on the touch screen, forming a sliding track on the touch screen in response to the operation; judging whether the sliding track meets a predetermined condition so as to generate judgment information, wherein the predetermined condition is that the sliding track is a curvilinear track and comprises a first contact point and a second contact point, the first contact point and the second contact point being contact points which coincide or not coincide with each other; and determining an independent operation area on the touch screen based on the sliding track, and determining a display orientation of a displayed object within the independent operation area based on the sliding track when the judgment information indicates that the sliding track meets the predetermined condition.

Preferably, the sliding track is a closed curvilinear track when the first contact point is the starting position of the sliding track and the second contact point is the ending position of the sliding track, and the first contact point and the second contact point are contact points which coincide with each other; the sliding track is a non-closed curvilinear track when the first contact point is the starting position of the sliding track and the second contact point is the ending position of the sliding track, and the first contact point and the second contact point are contact points which do not coincide with each other.

Preferably, when the sliding track is the closed curvilinear track, determining an independent operation area on the touch screen based on the sliding track comprises: determining a closed area formed on the touch screen by the closed curvilinear track as the independent operation area.

Preferably, determining a display orientation of a displayed object within the independent operation area based on the sliding track comprises: determining the top of the displayed object close to the first contact point and the second contact point.

Preferably, when the sliding track is the non-closed curvilinear track, determining an independent operation area on the touch screen based on the sliding track comprises: connecting the first contact point and the second contact point so as to form a first connecting line; and determining a closed area formed on the touch screen by the non-closed curvilinear track and the first connecting line as the independent operation area.

Preferably, determining a display orientation of a displayed object within the independent operation area based on the sliding track comprises: determining the display orientation of the displayed object based on the relation between the geometries of closed areas and display orientations and based on the geometry of the closed area.

Preferably, when the detection information indicates that there is an operation input on the touch screen, the method further comprises: recording characteristic information of an operator which triggers the operation, the characteristic information indicating characters of the operator which is allowed to operate in the independent operation area.

The present invention provides an apparatus for controlling an electric device. The electric device has a touch screen. The apparatus comprises: a detection unit configured to detect whether there is an operation input on the touch screen so as to generate detection information; a response unit configured to, when the detection information indicates that there is an operation input on the touch screen, form a sliding track on the touch screen in response to the operation; a judging unit configured to judge whether the sliding track meets a predetermined condition so as to generate judgment information, wherein the predetermined condition is that the sliding track is a curvilinear track and comprises a first contact point and a second contact point, the first contact point and the second contact point being contact points which coincide or not coincide with each other; and a determination unit configured to determine an independent operation area on the touch screen based on the sliding track, and determine a display orientation of a displayed object within the independent operation area based on the sliding track when the judgment information indicates that the sliding track meets the predetermined condition.

Preferably, the sliding track is a closed curvilinear track when the first contact point is the starting position of the sliding track and the second contact point is the ending position of the sliding track, and the first contact point and the second contact point are contact points which coincide with each other; the sliding track is a non-closed curvilinear track when the first contact point is the starting position of the sliding track and the second contact point is the ending position of the sliding track, and the first contact point and the second contact point are contact points which do not coincide with each other.

Preferably, when the sliding track is the closed curvilinear track, the determination unit is further configured to determine a closed area formed on the touch screen by the closed curvilinear track as the independent operation area.

Preferably, the determination unit is further configured to determine the top of the displayed object close to the first contact point and the second contact point.

Preferably, when the sliding track is the non-closed curvilinear track, the determination unit is further configured to connect the first contact point and the second contact point so as to form a first connecting line, and determine a closed area formed on the touch screen by the non-closed curvilinear track and the first connecting line as the independent operation area.

Preferably, the determination unit is further configured to determine the display orientation of the displayed object based on the relation between the geometries of closed areas and display orientations and based on the geometry of the closed area.

Preferably, the apparatus further comprises a recording unit configured to, when the detection information indicates that there is an operation input on the touch screen, record characteristic information of an operator which triggers the operation, the characteristic information indicating characters of the operator which is allowed to operate in the independent operation area.

The present invention has advantageous effects as follows.

In an embodiment of the present invention, it is judged whether a sliding track formed on a touch screen by an operator meets a predetermined condition or not, wherein the predetermined condition is that the sliding track is a curvilinear track and comprises a first contact point and a second contact point, the first contact point and the second contact point being contact points which coincide or not coincide with each other. If it is judged that the predetermined condition is met, an independent operation area is determined based on the sliding track, and meanwhile a display orientation of a displayed object within the independent operation area is determined based on the sliding track. Therefore, two issues, i.e. the operation area and the display orientation, are solved by one action, such that the time is saved and the user experience is improved.

Further, in an embodiment of the present invention, the characteristic information of the operator, such as, finger print information, is recorded, and therefore only that operator which complies with the characteristic information is allowed to operate in the determined independent operation area. In this way, other users may be prevented from operating in the area by touching this area accidently.

DETAILED DESCRIPTION OF PREFERRED EMBODIMENTS

Figure 1:
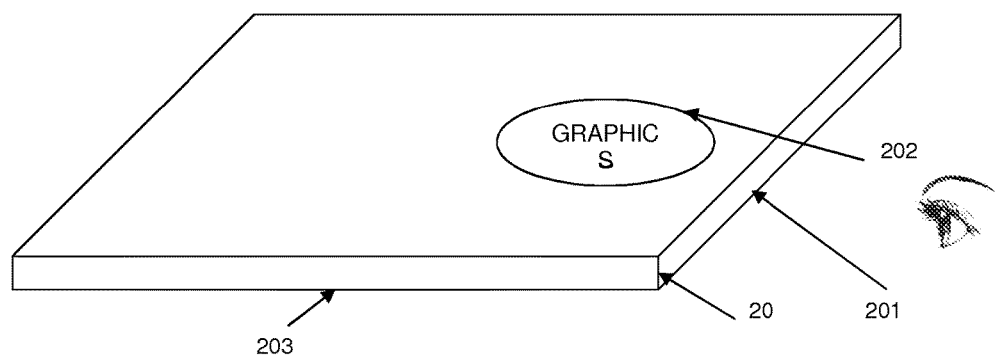
FIG. 1 is a schematic diagram when controlling an electric device in prior art.
Figure 2:
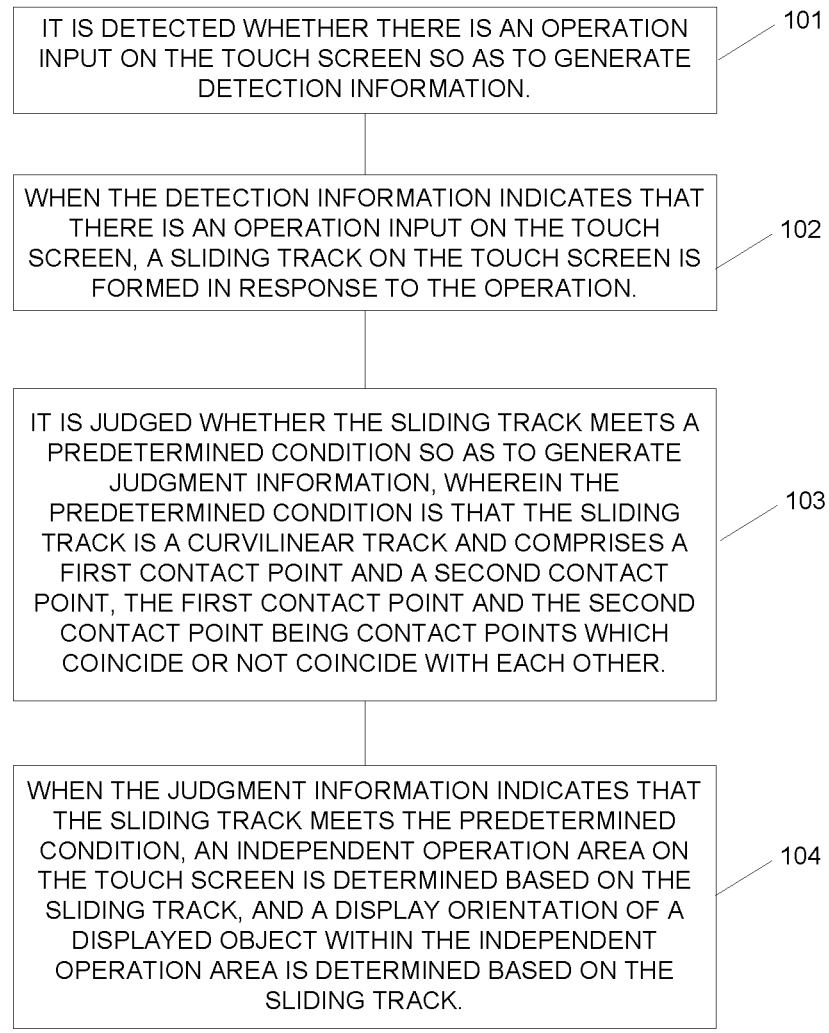
FIG. 2 is a flow chart of a method for controlling an electric device according to an embodiment of the present invention.

In an embodiment of the present invention, a method for controlling an electric device is provided. The electric device has a touch screen. The electric device is, for example, a mobile phone, a tablet, an all-in-one computer, or a TV, etc. Referring to FIG. 2, it is a flow chart of a method for controlling an electric device in the present embodiment.

As shown in FIG. 2, the method comprises:

Step 101: it is detected whether there is an operation input on the touch screen so as to generate detection information;

Step 102: when the detection information indicates that there is an operation input on the touch screen, a sliding track on the touch screen is formed in response to the operation;

Step 103: it is judged whether the sliding track meets a predetermined condition so as to generate judgment information, wherein the predetermined condition is that the sliding track is a curvilinear track and comprises a first contact point and a second contact point, the first contact point and the second contact point being contact points which coincide or not coincide with each other;

Step 104: when the judgment information indicates that the sliding track meets the predetermined condition, an independent operation area on the touch screen is determined based on the sliding track, and a display orientation of a displayed object within the independent operation area is determined based on the sliding track.

Figure 3:
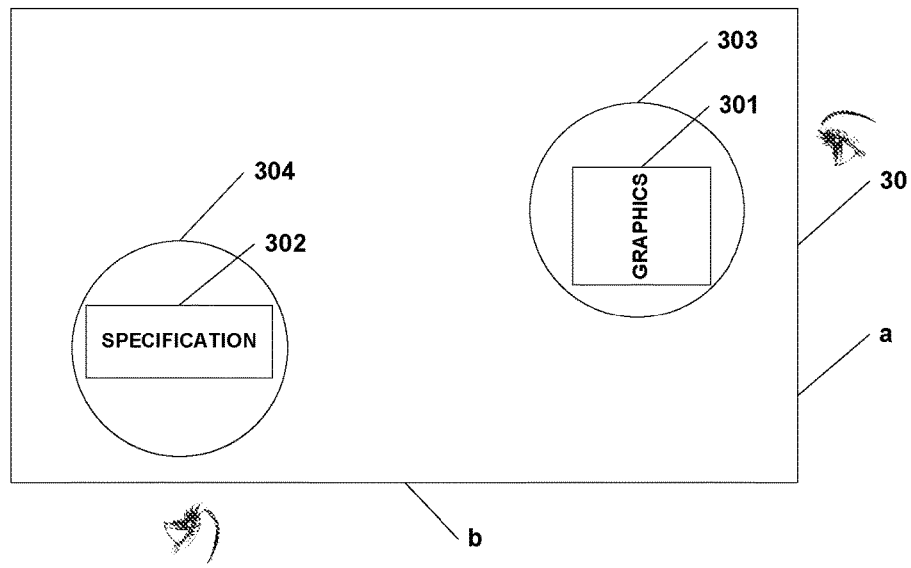
FIG. 3 is a schematic diagram when controlling an electric device according to an embodiment of the present invention.

Refer to both of FIG. 2 and FIG. 3. An electric device has, for example, a touch screen 30. A first user uses the electric device on the side of the edge "a", and a second user uses the electric device on the side of the edge "b". A first displayed to object 301 and a second displayed object 302 are displayed on the touch screen 30. At this time, the first user operates on the touch screen 30, and the operation forms a sliding track 303 on the touch screen 30. The first displayed object 301 is located in a closed area formed on the touch screen 30 by the sliding track 303. At this time, this closed area forms an independent operation area, and the display orientation of the first displayed object 301 is determined based on the sliding track 303 as a display orientation in which the bottom of the first displayed object 301 is close to the edge "a", as shown by the display orientation of the "GRAPHICS" in FIG. 3. In this way, it facilitates the first user in operating the first displayed object 301. Also, the second user operates on the touch screen 30, and the operation forms a sliding track 304 on the touch screen 30. The second displayed object 302 is located in a closed area formed on the touch screen 30 by the sliding track 304. This closed area forms an independent operation area, and the display orientation of the second displayed object 302 is also determined based on the sliding track 304 as a display orientation in which the bottom of the second displayed object 302 is close to the edge "b", as shown by the display orientation of the "SPECIFICATION" in FIG. 3. In this way, it facilitates the second user in operating the second displayed object 302.

To illustrate the present invention in more detail, specific examples are given below for specific description, in which the electric device is an all-in-one computer.

In an embodiment, the sliding track is a closed curvilinear track when the first contact point is the starting position of the sliding track and the second contact point is the ending position of the sliding track, and the first contact point and the second contact point are contact points which coincide with each other. In another embodiment, the sliding track is a non-closed curvilinear track when the first contact point is the starting position of the sliding track and the second contact point is the ending position of the sliding track, and the first contact point and the second contact point are contact points which do not coincide with each other. Description will be given below on how to determine the independent operation area and display orientation based on the sliding track in these two cases, respectively.

Figure 4:
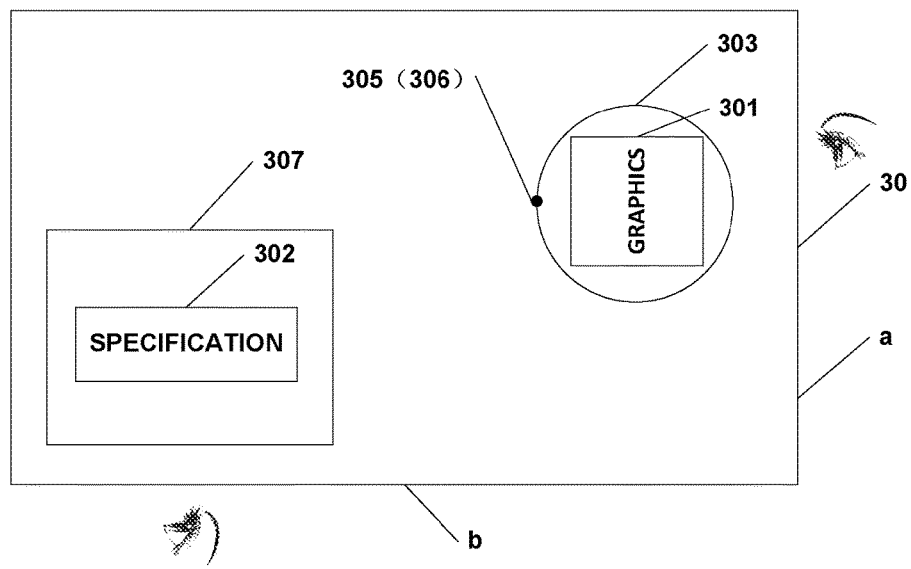
FIG. 4 is a schematic diagram when determining an operation area and a display orientation according a first embodiment of the present invention.

Refer to both of FIG. 2 and FIG. 4. When an operator (in the present embodiment, for example, it is a finger of the user, and in other embodiments, it may be a stylus or other implements for touching and controlling) is placed on the touch screen 30, the finger moves on the touch screen 30 to form a sliding track 303. It is then judged whether the sliding track 303 meets a predetermined condition. The predetermined condition is that the sliding track 303 is a curvilinear track and comprises a first contact point and a second contact point, the first contact point and the second contact point being contact points which coincide or not coincide with each other. As shown in FIG. 4, the sliding track 303 is a curvilinear track, and has two contact points which coincide with each other, i.e., the first contact point 305 and the second contact point 306. Therefore, the sliding track 303 meets the predetermined condition.

Further, in FIG. 4, the sliding track 303 is a closed curvilinear track. Therefore, the closed area formed on the touch screen by the sliding track 303 is determined as an independent operation area, and the display orientation of the first displayed object 301 is determined to be a display orientation in which the top of the first displayed object 301 is close to the first contact point 305 and the second contact point 306, i.e., the display orientation of the "GRAPHICS" in FIG. 4. In practice, the user may choose the starting position and the ending position, i.e. the positions corresponding to the first contact point 305 and the second contact point 306, based on his/her own position. For example, when the user is located at the side of the edge "a", it is chosen to draw a circle from the position away from the user to the position closer to the user (i.e., the edge "a"), regardless of clockwise or anticlockwise. In this way, when the user finishes drawing of the circle, the display orientation of the first displayed object 301 is same as that shown in FIG. 4, and it facilitates the user in relevant operations. Therefore, designation of the operation area and determination of the display orientation of the displayed object within the area are accomplished by just one action, such that the operating efficiency is enhanced and the user experience is improved.

Also, referring to FIG. 3, when the user is located at the side of the edge "b", and has drawn the sliding track 304, the display orientation of the second displayed object 302 is same as the display orientation of the "SPECIFICATION" in FIG. 3 as long as a circle is drawn from the position away from the edge "b" to the position closer to the edge "b". Such a display orientation is consistent with the visual angle of the user, and thus facilitates the user in operating the second displayed object 302.

In another embodiment, the display orientation of the displayed object within the area may be determined based on the geometry of the independent operation area determined by the sliding track. In the embodiments of FIG. 3 and FIG. 4, the display orientation of the displayed object within the area may be determined directly based on the geometry of the sliding track because the sliding track is a closed curve.

In particular, referring to FIG. 4, the sliding track 307 drawn by the second user is a rectangle. Therefore, it can be determined by looking up the relation between the geometries of closed area and display orientations, for example, in a relation table which is stored in a storage unit of the electric device. In the present embodiment, it can be set that, when the closed area is a square, the display orientation of the displayed object within the area is the display orientation where the bottom of the displayed object faces the edge "b", i.e., the display orientation of the "SPECIFICATION" in FIG. 4; when the closed area is a circle, the display orientation of the displayed object within the area is the display orientation where the bottom of the displayed object faces the edge "a", i.e., the display orientation of the "GRAPHICS" in FIG. 4. Therefore, in practice, when the user is located at the side of the edge "a", a circle is drawn to obtain a display orientation consistent with his/her own visual angle; when the user is located at the edge "b", a rectangle is drawn to obtain a display orientation consistent with his/her own visual angle.

Both of the circle and the rectangle mentioned in the present embodiment are not the circle and the rectangle by their exact definitions, respectively, and they may be circle-like and rectangle-like, such as, an ellipse, circle-like, etc. In practice, more graphics, for example, a triangle, a trapezoid, etc., can be set. The geometries of a plurality of closed areas may correspond to the same display orientation.

Next, the specific implementation in the case where the sliding track is a non-closed curvilinear track will be illustrated in detail.

Figure 5:
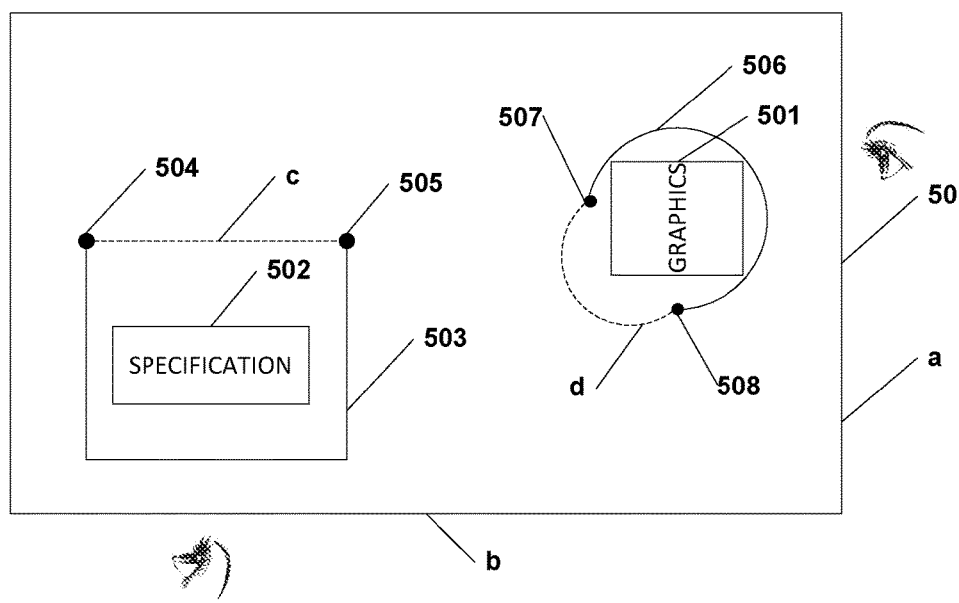
FIG. 5 is a schematic diagram when determining an operation area and a display orientation according a second embodiment of the present invention.

Referring to FIG. 5, the sliding track 503 is a non-closed curvilinear track (the solid line), and has a first contact point 504 and a second contact point 505. The first contact point 504 is, for example, the starting position of the sliding track 503, and the second contact point 505 is, for example, the ending position of the sliding track 503. When the sliding track formed on the touch screen 50 by user's operations is same as the sliding track 503 in FIG. 5, the first contact point 504 and the second contact point 505 are connected to form a first connecting line "c", and then the closed area formed on the touch screen 50 by the sliding track 503 and the first connecting line "c" is determined as an independent operation area. In the present embodiment, the sliding track 503 is a curve which has the geometry of a broken line. In this case, the determination unit of the touch screen 50 connects the first contact point 504 and the second contact point 505 with a line having a minimal length, i.e., the first connecting line "c" is a straight line.

In another embodiment, still referring to FIG. 5, the sliding track 506 is a non-closed curvilinear track (the solid line), and has a first contact point 507 and a second contact point 508. The first contact point 507 is, for example, the starting position of the sliding track 506, and the second contact point 508 is, for example, the ending position of the sliding track 506. When the sliding track formed on the touch screen 50 by user's operations is same as the sliding track 506 in FIG. 5, the first contact point 507 and the second contact point 508 are connected to form a second connecting line "d", and then the closed area formed on the touch screen 50 by the sliding track 506 and the second connecting line "d" is determined as an independent operation area. In the present embodiment, the sliding track 506 is a curve which has the geometry of an arc. In this case, the determination unit of the touch screen 50 draws a circle with a diameter being the line between the first contact point 507 and the second contact point 508, so as to connect the first contact point 507 and the second contact point 508. Therefore, the second connecting line "d" is an arc which has the geometry of a semicircle.

In other embodiments, the first connecting line "c" between the first contact point 504 and the second contact point 505 may be determined in the same way as that one used for determining the second connecting line "d", and the second connecting line "d" may also be determined in the same way as that one used for determining the first connecting line "c". In practice, one skilled in the art may also utilize other policies for connecting the first contact point and the second contact point. For example, if the sliding track is a non-closed arc curve, a tangent at the position corresponding to the first contact point and a tangent at the position corresponding to the second contact point may be determined first. The first contact point and the second contact point may be connected by these two tangents if the tangents may intersect with each other.

In the present embodiment, when the sliding track is a non-closed curve, the display orientation of the displayed object within the closed area may also be determined based on the relation between the geometries of closed areas and display orientations. For example, the closed area is a rectangle, and therefore the display orientation is same as the display orientation of the second displayed object 502 in FIG. 5, i.e., the display orientation of the "SPECIFICATION"; for example, the closed area has the circle-like geometry, and therefore the display orientation is same as the display orientation of the first displayed object 501 in FIG. 5, i.e., the display orientation of the "GRAPHICS". Please refer to the method for determining described in the above embodiments for the specific procedures, and the description thereof will be omitted for simplicity.

In another embodiment, in order to make the determined independent operation area available for only the user himself/herself and to prevent other users from operating in this independent operation area accidently, when the detection information indicates that there is an operation input on the touch screen, the characteristic information of the operator which triggers this operation is also recorded. The characteristic information is representative of characters of the operator who is allowed to operate in this independent operation area. For example, if the operator is a finger, the finger print information is recorded. Therefore, only the user who complies with the finger print information may operate the displayed objects in the operation area.

The methods described in above embodiments may be implemented individually or in combination, which depends on the implementation-specific choice of one skilled in the art.

Figure 6:
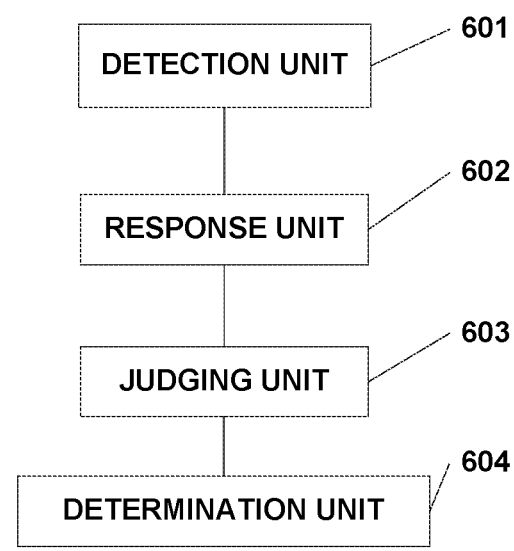
FIG. 6 is a functional block diagram of an apparatus for controlling an electric device according to an embodiment of the present invention.

Another embodiment of the present invention provides an apparatus for controlling an electric device in order to implement the method for controlling an electric device according to the above embodiments. The electric device has a touch screen. Referring to FIG. 6, it is a functional block diagram of the apparatus for controlling the electric device according to the present embodiment.

As shown in FIG. 6, the apparatus comprises: a detection unit 601 configured to detect whether there is an operation input on the touch screen so as to generate detection information; a response unit 602 configured to, when the detection information indicates that there is an operation input on the touch screen, form a sliding track on the touch screen in response to the operation; a judging unit 603 configured to judge whether the sliding track meets a predetermined condition so as to generate judgment information, wherein the predetermined condition is that the sliding track is a curvilinear track and comprises a first contact point and a second contact point, the first contact point and the second contact point being contact points which coincide or not coincide with each other; and a determination unit 604 configured to determine an independent operation area on the touch screen based on the sliding track, and determine a display orientation of a displayed object within the independent operation area based on the sliding track when the judgment information indicates that the sliding track meets the predetermined condition.

In the embodiment, the sliding track is a closed curvilinear track when the first contact point is the starting position of the sliding track and the second contact point is the ending position of the sliding track, and the first contact point and the second contact point are contact points which coincide with each other; the sliding track is a non-closed curvilinear track when the first contact point is the starting position of the sliding track and the second contact point is the ending position of the sliding track, and the first contact point and the second contact point are contact points which do not coincide with each other.

In a further embodiment, when the sliding track is the closed curvilinear track, the determination unit 604 is further configured to determine a closed area formed on the touch screen by the closed curvilinear track as the independent operation area. The determination unit 604 is further configured to determine the top of the displayed object close to the first contact point and the second contact point. In another embodiment, the determination unit 604 is further configured to determine the display orientation of the displayed object based on the relation between the geometries of closed areas and display orientations and based on the geometry of the closed area.

In another embodiment, when the sliding track is the non-closed curvilinear track, the determination unit 604 is further configured to connect the first contact point and the second contact point so as to form a first connecting line and determine a closed area formed on the touch screen by the non-closed curvilinear track and the first connecting line as the independent operation area. Further, the determination unit 604 is further configured to determine the display orientation of the displayed object based on the relation between the geometries of closed areas and display orientations and based on the geometry of the closed area.

In another embodiment, the apparatus further comprises a recording unit configured to, when the detection information indicates that there is an operation input on the touch screen, record characteristic information of an operator which triggers the operation, the characteristic information indicating characters of the operator which is allowed to operate in the independent operation area. The recording unit is a finger print reader, for example.

The methods described in above embodiments may be implemented individually or in combination, which depends on the implementation-specific choice of one skilled in the art.

Various changes and specific examples of the methods for controlling an electric device in the above embodiments may also be applicable to the apparatus for controlling an electric device in the present embodiment. By means of the above detailed description of the methods for controlling an electric device, one skilled in the art may easily recognize the implementations of the apparatus for controlling an electric device in the present embodiment. Therefore, the description thereof will be omitted for simplicity.

In an embodiment of the present invention, it is judged whether a sliding track formed by touch operations of an operator on a touch screen meets a predetermined condition or not, wherein the predetermined condition is that the sliding track is a curvilinear track and comprises a first contact point and a second contact point, the first contact point and the second contact point being contact points which coincide or not coincide with each other. If the predetermined condition is met, an independent operation area is determined based on the sliding track, and meanwhile a display orientation of a displayed object within the independent operation area is determined based on the sliding track. Therefore, two issues, i.e. the operation area and the display orientation, are solved by just one action, such that the time is saved and the user experience is improved.

Further, in an embodiment of the present invention, the characteristic information of the operator, such as, finger print information, is recorded, and therefore only the operator which complies with the characteristic information is allowed to operate in the determined independent operation area. In this way, other users may be prevented from operating in the area by touching this area accidently.

One skilled in the art should understand that the embodiments of the present invention may be provided as methods, systems, or computer program products. Therefore, the present invention may be embodied in form of pure hardware embodiments, pure software embodiments, or software and hardware combined embodiments. Furthermore, the present invention may be embodied in a form of a computer program product which is implemented on one or more computer usable storage medium (comprising but not limited to magnetic disk storage and optical storage) having computer usable program code therein.

The present invention is described with reference to the flowcharts and/or block diagrams of the methods, devices (systems), and computer program products according to the embodiments of the present invention. It should be understood that each flow and/or block in the flowcharts and/or block diagrams and combinations of the flows and/or blocks in the flowcharts and/or block diagrams can be implemented by computer program instructions. These computer program instructions may be provided to a general purpose computer, a special purpose computer, an embedded processing machine, or processor(s) of any other programmable data processing device to generate a machine, such that means for implementing functions specified in one or more flows of the flowcharts and/or one or more blocks of the block diagrams is generated by instructions executed by a computer or processor(s) of any other programmable data processing device.

These computer program instructions may also be stored in computer readable memories which can guide a computer or any other programmable data processing device in such a specific way that the instructions stored in the computer readable memories generate an article of manufacture comprising instruction means which implements functions specified in one or more flows of the flowcharts and/or one or more blocks of the block diagrams.

These computer program instruction may also be loaded into a computer or any other programmable data processing device such that a series of operation steps may be performed on the computer or the programmable device so as to achieve the processing implementable by the computer, thereby the instructions executed on the computer or the programmable device provide steps for implementing functions specified in one or more flows of the flowcharts and/or one or more blocks of the block diagrams.

It is obvious for one skilled in the art to make various modifications and variations to the present invention without departing from the spirit and scope of the present invention. Therefore, if these modifications and variations of the present invention fall in the scope of the claims of the present invention and its equivalents, the present invention intends to include these modifications and variations.

What is claimed is:

1. A method for controlling an electric device which has a touch screen, comprising:
   detecting whether there is an operation input on said touch screen, forming a sliding track on said touch screen in response to said operation if it is detected there is an operation input on said touch screen;
   deciding whether said sliding track meets a predetermined condition, wherein said predetermined condition is that said sliding track is a curvilinear track and comprises a first contact point and a second contact point, said first contact point and said second contact point being contact points which coincide or do not coincide with each other; and
   determining an closed area enclosed by the sliding track as an independent operation area separated from other operation area on said touch screen if it is decided that said sliding track meets said predetermined condition, where a display orientation of a displayed object within said independent operation area is independent of the display orientation within other operation area on said touch screen and is determined based on said sliding track, and
   wherein said first contact point is the starting position of said sliding track and said second contact point is the ending position of said sliding track; and
   wherein the display orientation of a displayed object within said independent operation area is determined as: the top of the displayed object close to said first contact point and said second contact point.

2. The method according to claim 1, wherein said sliding track is a closed curvilinear track when said first contact point and said second contact point are contact points which coincide with each other; and wherein said sliding track is a non-closed curvilinear track when said first contact point and said second contact point are contact points which do not coincide with each other.

3. The method according to claim 2, wherein when said sliding track is said closed curvilinear track, said determining a closed area enclosed by the sliding track as an independent operation area comprises:
   determining a closed area formed on said touch screen by said closed curvilinear track as said independent operation area.

4. The method according to claim 2, wherein when said sliding track is said non-closed curvilinear track, said determining a closed area enclosed by the sliding track as an independent operation area comprises:
   connecting said first contact point and said second contact point so as to form a first connecting line; and determining a closed area formed on said touch screen by said non-closed curvilinear track and said first connecting line as said independent operation area.

5. A method for controlling an electric device which has a touch screen, comprising:
  detecting whether there is an operation input on said touch screen;
  forming a sliding track on said touch screen in response to said operation if it is detected there is an operation input on said touch screen;
  deciding whether said sliding track meets a predetermined condition, wherein said predetermined condition is that said sliding track is a curvilinear track and comprises a first contact point and a second contact point, said first contact point and said second contact point being contact points which coincide or do not coincide with each other; and
  determining an closed area enclosed by the sliding track as an independent operation area separated from other operation area on said torch screen it is decided that said sliding track meets said predetermined condition, wherein a display orientation of a displayed object within said independent operation area is independent of the display orientation within other operation area on said touch screen and is determined based on the geometry of the closed area, and wherein different geometries of the closed area correspond to different display orientations of the independent operation area.

6. The method according to claim 1, the method further comprises:
  recording characteristic information of an operator which is allowed to operate in the independent operation area.

7. An apparatus for controlling an electric device which has a touch screen, comprising:
  a memory; and
  a processor coupled to the memory and configured to:
    detect whether there is an operation input on said touch screen;
    if it is detected that there is an operation input on said touch screen, form a sliding track on said touch screen in response to said operation;
    decide whether said sliding track meets a predetermined condition, wherein said predetermined condition is that said sliding track is a curvilinear track and comprises a first contact point and a second contact point, said first contact point and said second contact point being contact points which coincide or not coincide with each other; and
    determine an closed area enclosed by the sliding track as an independent operation area separated from other operation area on said touch screen if it is decided that said sliding track meets said predetermined condition, where a display orientation of a displayed object within said independent operation area is independent of the display orientation within other operation area on said touch screen and is determined based on said sliding track,
  wherein said first contact point is the starting position of said sliding track and said second contact point is the ending position of said sliding track, and
  wherein the processor is further configured to determine the display orientation of a displayed object within said independent operation area as the top of the displayed object close to said first contact point and said second contact point.

8. The apparatus according to claim 7, wherein
  said sliding track is a closed curvilinear track said second contact point is the ending position of said sliding track, and said first contact point and said second contact point are contact points which coincide with each other;
  said sliding track is a non-closed curvilinear track when said first contact point and said second contact point are contact points which do not coincide with each other.

9. The apparatus according to claim 8, wherein when said sliding track is said closed curvilinear track, the processor is further configured to determine a closed area formed on said touch screen by said closed curvilinear track as said independent operation area.

10. The apparatus according to claim 8, wherein when said sliding track is said non-closed curvilinear track, the processor is further configured to connect said first contact point and said second contact point so as to form a first connecting line, and determine a closed area formed on said touch screen by said non-closed curvilinear track and said first connecting line as said independent operation area.

11. An apparatus for controlling an electric device which has a touch screen, comprising:
  a memory; and
  a processor coupled to the memory and configured to:
    detect whether there is an operation input on said touch screen;
    if it is detected that there is an operation input on said touch screen, form a sliding track on said touch screen in response to said operation;
    decide whether said sliding track meets a predetermined condition, wherein said predetermined condition is that said sliding track is a curvilinear track and comprises a first contact point and a second contact point, said first contact point and said second contact point being contact points which coincide or not coincide with each other; and
    determine an closed area enclosed by the sliding track as an independent operation area separated from other operation area on said touch screen if it is decided that said slid in track meets said redetermined condition, wherein a display orientation of a displayed object within said independent operation area is independent of the display orientation within other operation area on said touch screen and is determined based on the geometry of the closed area, wherein different geometries of the closed area correspond to different display orientations of the independent operation area.

12. The apparatus according to claim 7, further comprising a recording unit configured to record characteristic information of an operator which is allowed to operate in the independent operation area.

13. The method according to claim 5, further comprising recording characteristic information of an operator which is allowed to operate in the independent operation area.

14. The apparatus according to claim 11, further comprising a recording unit configured to record characteristic information of an operator which is allowed to operate in the independent operation area.

* * * * *